US008267801B2

(12) United States Patent
Gresse

(10) Patent No.: US 8,267,801 B2
(45) Date of Patent: Sep. 18, 2012

(54) HOMOKINETIC JOINT

(75) Inventor: Cedric Gresse, Andresy (FR)

(73) Assignee: GKN Driveline S.A., Carrieres-Sous-Poissy (FR)

( * ) Notice: Subject to any disclaimer, the term of this patent is extended or adjusted under 35 U.S.C. 154(b) by 471 days.

(21) Appl. No.: 12/445,265

(22) PCT Filed: Sep. 27, 2007

(86) PCT No.: PCT/FR2007/001584
§ 371 (c)(1),
(2), (4) Date: Sep. 30, 2009

(87) PCT Pub. No.: WO2008/046977
PCT Pub. Date: Apr. 24, 2008

(65) Prior Publication Data
US 2010/0022314 A1    Jan. 28, 2010

(30) Foreign Application Priority Data
Oct. 12, 2006   (FR) ...................................... 06 08956

(51) Int. Cl.
*F16D 3/205*   (2006.01)
(52) U.S. Cl. ........................................ 464/111; 464/905
(58) Field of Classification Search .................. 464/111, 464/169, 905; 403/113, 114, 146
See application file for complete search history.

(56) References Cited

U.S. PATENT DOCUMENTS

| | | | |
|---|---|---|---|
| 1,863,244 A * | 6/1932 | Goddard ................... | 464/169 X |
| 1,987,678 A * | 1/1935 | Ketcham et al. .......... | 464/169 X |
| 2,208,314 A * | 7/1940 | Snyder ...................... | 464/169 X |
| 3,310,961 A * | 3/1967 | Ristau | |
| 3,757,534 A * | 9/1973 | Orain ........................... | 464/111 |
| 3,792,598 A * | 2/1974 | Orain ........................... | 464/111 |
| 4,318,282 A * | 3/1982 | Orain ........................... | 464/111 |
| 4,320,632 A * | 3/1982 | Dore' ........................... | 464/111 |
| 4,516,957 A * | 5/1985 | Chyz et al. ................... | 464/111 |
| 4,592,736 A * | 6/1986 | Mangiavacchi .............. | 464/111 |
| 4,605,384 A | 8/1986 | Kurzeja et al. | |
| 4,747,803 A * | 5/1988 | Kimata et al. ................ | 464/111 |
| 4,795,404 A * | 1/1989 | Sutton et al. .................. | 464/111 |

(Continued)

FOREIGN PATENT DOCUMENTS

FR   2050826 A   4/1971

(Continued)

OTHER PUBLICATIONS

International Search Report for PCT/FR2007/001584 dated Mar. 13, 2008.

*Primary Examiner* — Gregory Binda
*Assistant Examiner* — Matthieu Setliff
(74) *Attorney, Agent, or Firm* — Rader, Fishman & Grauer, PLLC

(57) ABSTRACT

A homokinetic joint is described that comprises a male member with several arms, a female member for receiving the male member, a roller mounted and freely rotating on each arm, a spring provided between the male member and the female member and for urging the male member away from the female member, and a cup provided between the spring and the male member. The cup includes a skirt comprising an outer surface designed to contact at least one of the rollers when the joint is in a separated state.

20 Claims, 4 Drawing Sheets

U.S. PATENT DOCUMENTS

| | | | |
|---|---|---|---|
| 4,904,227 A | | 2/1990 | Sasaki et al. |
| 5,062,821 A | * | 11/1991 | Moulinet ............. 464/111 |
| 5,356,341 A | * | 10/1994 | Uchman et al. |
| 5,899,814 A | * | 5/1999 | Murillo ............. 464/905 X |
| 6,190,260 B1 | * | 2/2001 | Flores et al. ............. 464/111 |
| 6,547,667 B2 | * | 4/2003 | Sugiyama et al. ............. 464/111 |
| 7,232,000 B2 | * | 6/2007 | Brossard ............. 464/111 X |
| 7,354,347 B2 | * | 4/2008 | Sugiyama et al. ............. 464/111 |
| 7,878,914 B2 | * | 2/2011 | Oh ............. 464/111 |
| 8,029,375 B2 | * | 10/2011 | Takekawa ............. 464/169 X |
| 2011/0159969 A1 | * | 6/2011 | Cho et al. ............. 464/111 |

FOREIGN PATENT DOCUMENTS

| | | | |
|---|---|---|---|
| FR | 2610682 A1 | * | 8/1988 |
| FR | 2610682 A2 | | 8/1988 |

\* cited by examiner

HOMOKINETIC JOINT

CROSS-REFERENCE TO RELATED APPLICATIONS

This application is a National Stage application which claims the benefit of International Application No. PCT/FR2007/001584 filed Sep. 27, 2007, which claims priority to French Application No. 0608956 filed on Oct. 12, 2006, both applications of which are hereby incorporated by reference in their entirety.

FIELD

The present disclosure relates to a homokinetic joint comprising a male member comprising several arms; a female member receiving the male member; a roller mounted to rotate freely on each arm; a spring interposed between the male member and the female member and suitable for urging the male member away from the female member; and a cup interposed between the spring and the male member.

BACKGROUND

Homokinetic joints comprising a male member having several arms, and a female member receiving the male member are known from the prior art. A roller is mounted to rotate freely and rock freely on each arm of the male member.

In the known homokinetic joints, a spring is interposed between the male member and the female member, this spring being suitable for urging, on the one hand, the male member away from the female member and, on the other hand, the female member against a stop.

In order to hold the spring in position relative to the male member, a cup is secured to an end of the spring directed towards the male member.

When the homokinetic joint is in the bent state, the cup is offset angularly and comes into contact with one of the rollers.

The cup of the prior art leads to a jamming thereof in the opening of the roller, which impairs the correct operation of the joint.

SUMMARY

The disclosure relates to a homokinetic joint of the type indicated, wherein the cup has a skirt provided with an outer surface which is suitable for coming into contact with at least one of the rollers when the joint is in a separated state.

According to other embodiments, the homokinetic joint includes one or more of the following features: the skirt comprises an edge, and, in all of the configurations of the joint, the edge is out of contact with the roller; the roller is suitable for pushing the cup back into a centred position in which the cup is located when the joint is in an aligned state; the cup has a bearing having a concave partial sphere surface which is placed against a bearing having a convex partial sphere surface fixedly joined to the male member; an outer surface is frustoconical with a conicity of less than 2°; the cup has an internal undercut retaining the spring axially on the cup; the female member has a housing receiving one end of the spring; and at least one roller can rock freely on the arm.

BRIEF DESCRIPTION OF THE DRAWINGS

The disclosure will be better understood on reading the following description which is given purely by way of example and with reference to the appended drawings in which.

DETAILED DESCRIPTION

Figure 1:
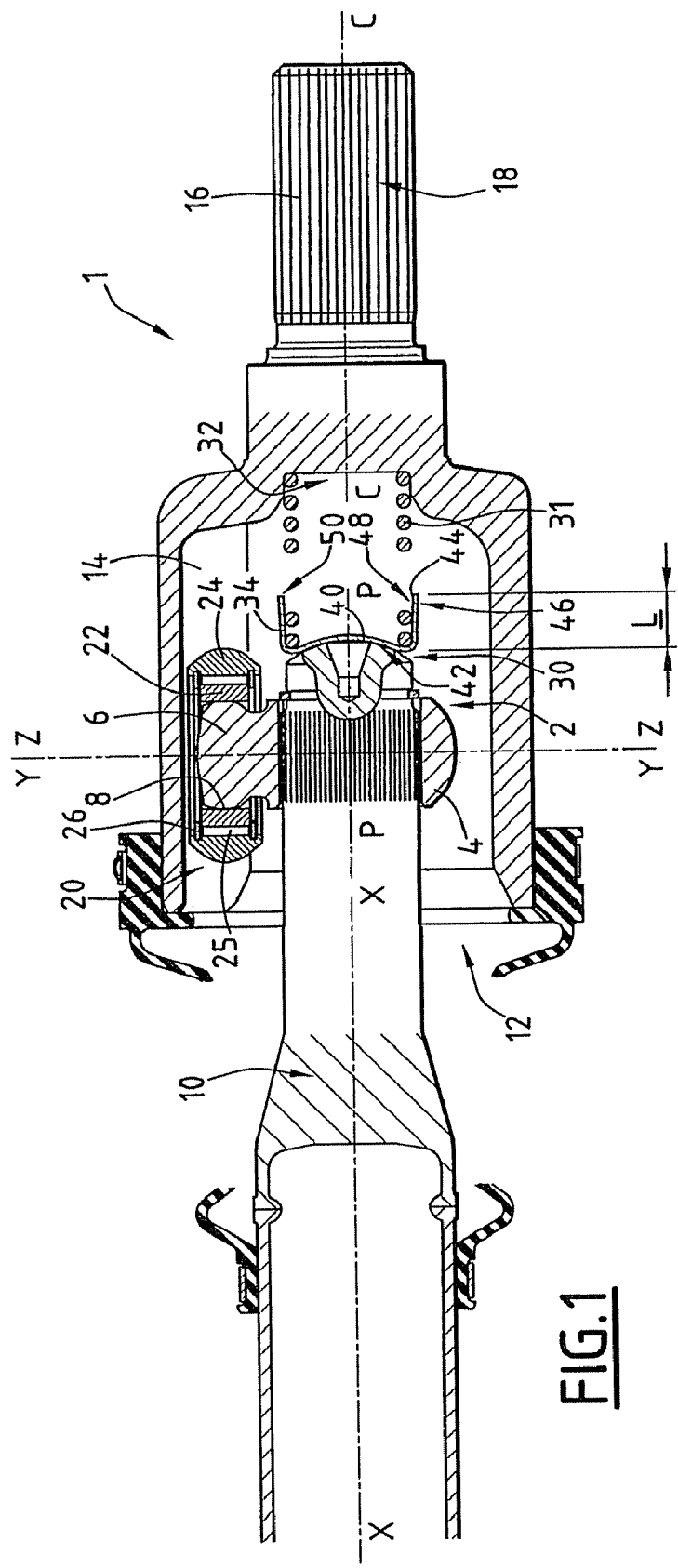
FIG. 1 is a longitudinal section through a homokinetic joint in an aligned state.

The homokinetic joint 1 illustrated by FIGS. 1 and 2 will now be described. A male member or tripod 2 is shown, carrying a hub 4, with a center axis X-X, from which three radial arms 6 spaced angularly by 120° project. Each arm 6 defines an axis Y-Y. An end portion of each arm 6 forms an integral spherical bearing 8 centered on the axis Y-Y of the corresponding arm 6. The male member 2 is fixedly joined to a first rotational shaft 10, the axis of which is the axis X-X. A female member or socket 12 is also provided, the center axis C-C of which, in the aligned position of the joint 1 shown, coincides with the axis X-X. On one side and the other of each arm 6, this socket 12 has two roller tracks 14 located opposite each other. The socket 12 is fixedly joined to a second rotational shaft 16 provided with splines 18. For each arm 6, a roller assembly 20 having an axis Z-Z is provided; this axis Z-Z coinciding with the axis Y-Y of the associated arm 6 in the aligned position of the joint, shown in FIG. 1.

Each roller assembly 20 comprises an inner ring 22 in the general shape of a hollow cylinder having an axis Z-Z, an outer roller 24 which has a general form generated by revolution about axis Z-Z and which surrounds the inner ring 22 with spacing, a ring of needles 25 arranged between the inner ring 22 and the outer roller 24, and means 26 for the axial retention of the outer roller 24 and the ring of needles 25 relative to the inner ring 22. The roller is mounted to rotate freely about the axis Y-Y of the arm and to rock freely about an axis perpendicular to the axis Y-Y.

The homokinetic joint 1 also comprises a bearing 30 having a convex partial sphere surface, which is formed on a free end of the shaft 10 directed towards the socket 12.

The homokinetic joint 1 also comprises a return spring 31 which is suitable for urging the socket 12 away from the shaft 10 and therefore away from the hub 4. The spring 31 comprises a first end which is received in a substantially cylindrical recess 32 provided in the axial base of the socket 12.

The spring 31 comprises a second end via which is supported on the bearing 30. To be more precise, the second end is placed on a cup 34 which is placed on the bearing 30.

The cup 34 has a form generated by revolution about its own center axis P-P. This cup 34 comprises a base 40 having a bearing 42 which has a surface in the shape of a concave partial sphere, complementing the surface of the bearing 30 of the shaft 10. The cup 34 is provided with a skirt 44. The skirt 44 has an outer surface 46 and an inner surface 48. The free end of the skirt 44, which is the end remote from the base 40, forms an edge 50.

The axial length L of the skirt 44 relative to its own axis P-P is selected to be so great that, when the joint 1 is in a bent state, it is the outer surface 46 which comes into contact with the outer roller 24, and the edge 50 is at all times and in all configurations of the joint out of contact with the outer roller 24.

Furthermore, when the joint is brought from its bent configuration into its aligned configuration, the roller 24 is suitable for pushing the cup 34 back into a centred position in which the cup 34 is located when the homokinetic joint 1 is in the aligned state.

The outer surface 46 has a frustoconical shape having a conicity relative to its own axis P-P of less than 2°, which facilitates the manufacture of the cup 34 by nesting.

Figure 2:
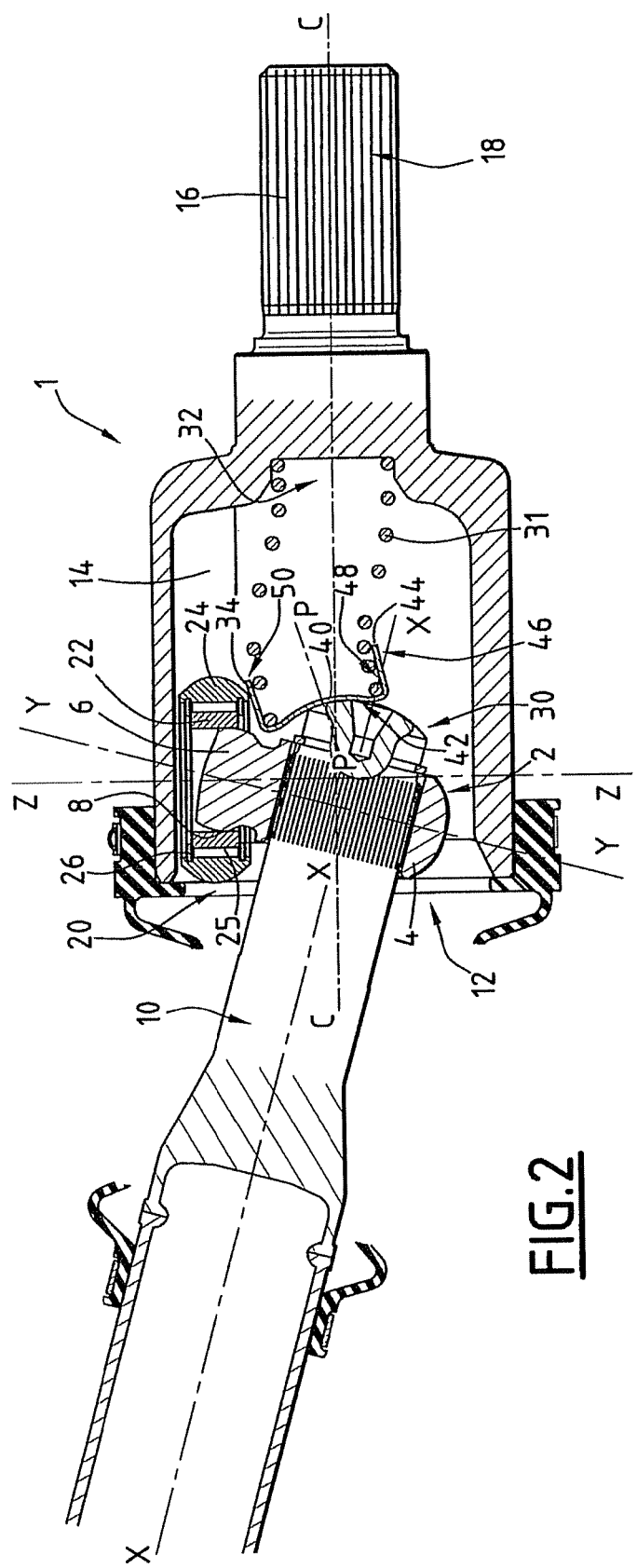
FIG. 2 is a view of the joint of FIG. 1 in a separated state.
Figure 3:
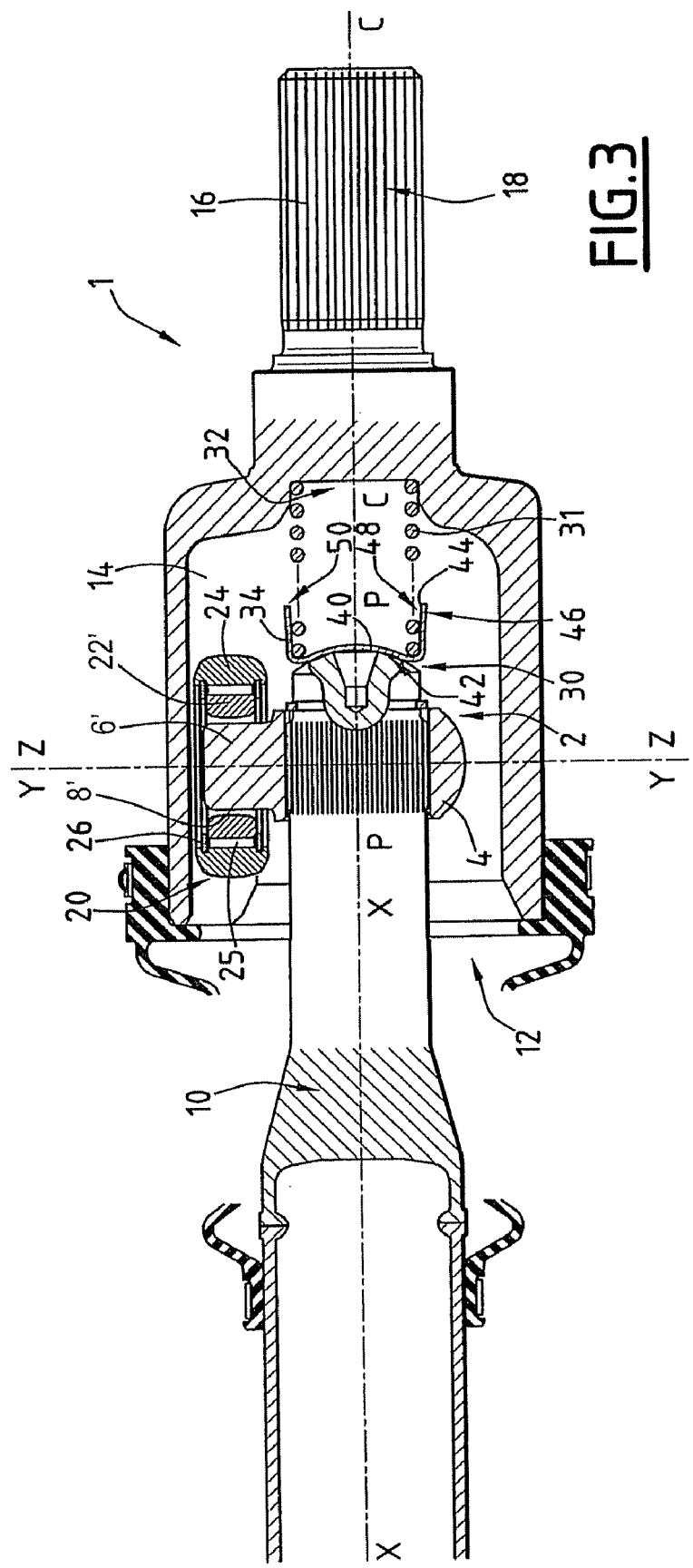
FIG. 3 is an alternative illustration of the homokinetic joint of FIG. 1.

FIG. 3 shows an alternative illustration of the homokinetic joint which is distinguished from that of FIG. 1. As illustrated in FIG. 3, each arm 6' has a cylindrical surface 8' of axis Y-Y which co-operates with an inner spherical surface of the inner ring 22'.

Figure 4:
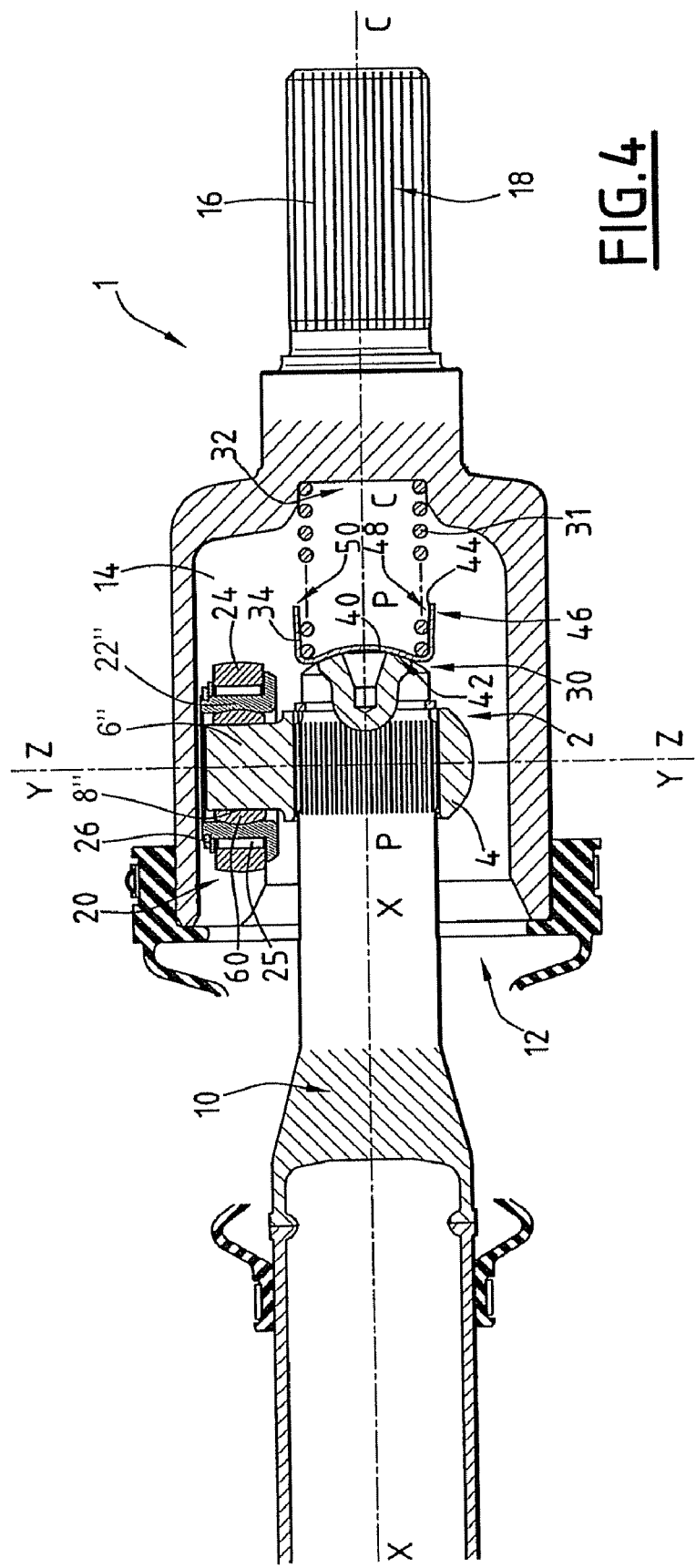
FIG. 4 is another alternative illustration of the homokinetic joint of FIG. 1.

FIG. 4 shows another alternative illustration of the homokinetic joint which is distinguished from that of FIG. 1 by the following. Each arm 6" has a cylindrical surface 8" of axis Y-Y which co-operates with an intermediate collar 60. This collar has a cylindrical surface co-operating with the arm 6" and a spherical outer surface co-operating with a spherical annular groove formed in the inner ring 22".

In a variant which is not shown, the cup 34 has a radially internal undercut which is suitable for retaining the spring 31 axially on the cup 34.

In yet another variant, the disclosure is also applicable to joints, the rollers of which are free in terms of rotation on the arm but fixed in terms of rocking relative to the arm.

What is claimed is:

1. A homokinetic joint comprising:
a male member comprising a plurality of arms;
a female member receiving the male member;
a roller mounted to rotate freely on each of the arms;
a spring interposed between the male member and the female member, the spring urging the male member away from the female member; and
a cup interposed between the spring and the male member, wherein the cup has a skirt provided with an outer surface for coming into contact with at least one of the rollers when the homokinetic joint is in a bent state, and the roller is operable to push the cup towards a centered position when the male and female members are moved towards an aligned state.

2. The homokinetic joint according to claim 1, wherein the skirt comprises an edge, and wherein the edge is out of contact with the roller in all configurations of the homokinetic joint.

3. The homokinetic joint according to claim 2, wherein the joint is configured such that when the joint is brought back from the bent state into an aligned state, the roller pushes the cup back into a centered position in which the cup is located when the homokinetic joint is in the aligned state.

4. The homokinetic joint according to claim 2, wherein the cup has a bearing having a concave partial sphere surface which is placed against a bearing having a convex partial sphere surface fixedly joined to the male member.

5. The homokinetic joint according to claim 2, wherein the outer surface is generally frustoconical with a conicity of about less than 2°.

6. The homokinetic joint according to claim 2, wherein the female member has a housing receiving an end of the spring.

7. The homokinetic joint according to claim 2, wherein the roller is mounted to rock freely on the arm.

8. The homokinetic joint according to claim 1, wherein the joint is configured such that when the joint is brought from the bent state back towards an aligned state, the roller pushes the cup towards a centered position in which the cup is located when the homokinetic joint is in the aligned state.

9. The homokinetic joint according to claim 8, wherein the roller is mounted to rock freely on the arm.

10. The homokinetic joint according to claim 1, wherein the cup has a bearing having a generally concave partial sphere surface which is placed against a bearing having a generally convex partial sphere surface fixedly joined to the male member.

11. The homokinetic joint according to claim 1, wherein the outer surface is generally frustoconical with a conicity of about less than 2°.

12. The homokinetic joint according to claim 1, wherein the female member has a housing receiving an end of the spring.

13. The homokinetic joint according to claim 1, wherein each roller is mounted to rock freely on the arm.

14. The homokinetic joint according to claim 13, wherein the arms each have an axis (Y-Y), and in that the roller of the homokinetic joint is part of a roller assembly, wherein in addition to the roller, the roller assembly further comprises an inner ring and a ring of needles arranged between the inner ring and the roller.

15. The homokinetic joint according to claim 14, wherein an end portion of each arm forms a spherical bearing, which is integral and centered on the axis (Y-Y) belonging to the corresponding arm.

16. The homokinetic joint according to claim 14, wherein the end portion of each arm has a cylindrical surface around the axis (Y-Y) of each of the arms.

17. The homokinetic joint according to claim 16, wherein the cylindrical surface co-operates with an inner spherical surface of the inner ring.

18. The homokinetic joint according to claim 16, wherein the cylindrical surface co-operates with an intermediate collar, the collar having a cylindrical surface co-operating with the arm and a spherical outer surface co-operating with a spherical annular groove formed in the inner ring.

19. A homokinetic joint comprising:
a male member comprising a plurality of arms;
a female member receiving the male member;
a roller mounted to rotate freely on each of the arms;
a spring interposed between the male member and the female member, the spring urging the male member away from the female member; and
a cup interposed between the spring and the male member, the cup having a base, an outer surface and an edge opposite the base,
wherein the cup moves independent of the male member, the outer surface of the cup contacts a roller when the male and female members are not aligned, and the roller is operable to push the cup to a centered position when the male and female members are moved towards an aligned state.

20. A homokinetic joint comprising:
a male member comprising a plurality of arms;
a female member receiving the male member;
a roller mounted to rotate on each arm;
a spring interposed between the male member and the female member;
a cup interposed between the spring and the male member the cup having an outer surface; and
a bearing having a convex partial spherical surface, the bearing formed on an end of the male member and is positioned adjacent the cup wherein the outer surface of the cup contacts a roller; and wherein the roller encourages the cup towards a centered position when the male and female members move towards an aligned state.

* * * * *